No. 727,100. PATENTED MAY 5, 1903.
F. T. CURRIER.
REVERSIBLE DRIVING MECHANISM FOR MOTOR DRIVEN MACHINERY.
APPLICATION FILED AUG. 22, 1902.
NO MODEL. 3 SHEETS—SHEET 1.

No. 727,100. PATENTED MAY 5, 1903.
F. T. CURRIER.
REVERSIBLE DRIVING MECHANISM FOR MOTOR DRIVEN MACHINERY.
APPLICATION FILED AUG. 22, 1902.
NO MODEL. 3 SHEETS—SHEET 2.
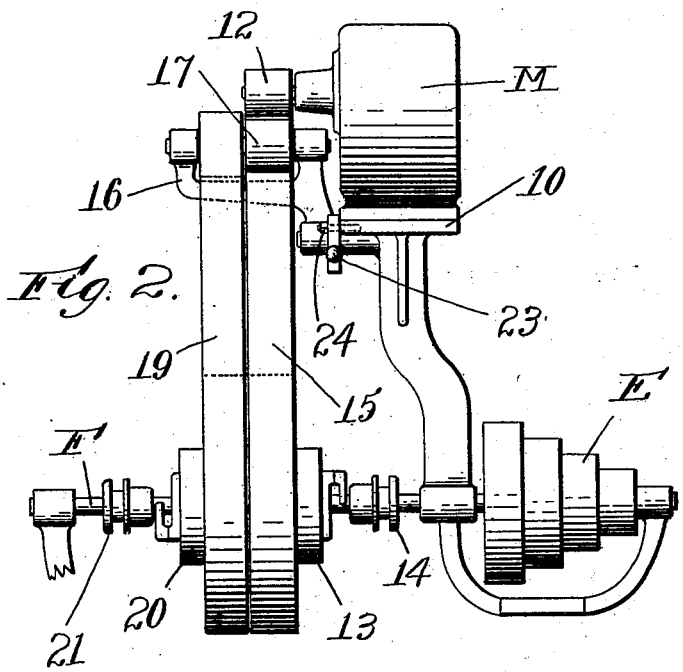
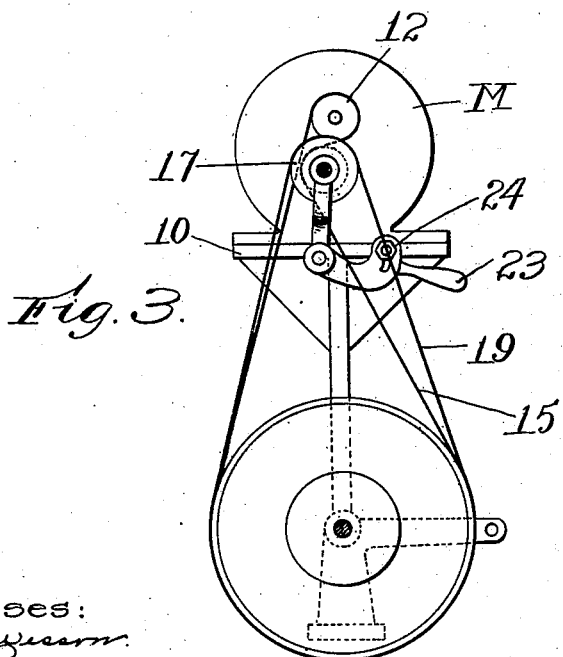

No. 727,100. PATENTED MAY 5, 1903.
F. T. CURRIER.
REVERSIBLE DRIVING MECHANISM FOR MOTOR DRIVEN MACHINERY.
APPLICATION FILED AUG. 22, 1902.
NO MODEL. 3 SHEETS—SHEET 3.

Witnesses:
C. F. Wesson.
M. E. Regan.

Inventor:
F. T. Currier.
By
Southgate & Southgate
Attorneys.

No. 727,100.

Patented May 5, 1903.

UNITED STATES PATENT OFFICE.

FRANK T. CURRIER, OF WORCESTER, MASSACHUSETTS.

REVERSIBLE DRIVING MECHANISM FOR MOTOR-DRIVEN MACHINERY.

SPECIFICATION forming part of Letters Patent No. 727,100, dated May 5, 1903.

Application filed August 22, 1902. Serial No. 120,645. (No model.)

*To all whom it may concern:*

Be it known that I, FRANK T. CURRIER, a citizen of the United States, residing at Worcester, in the county of Worcester and State of Massachusetts, have invented a new and useful Reversible Driving Mechanism for Motor-Driven Machinery, of which the following is a specification.

This invention relates to a driving mechanism which has been especially designed for driving metal-working tools or similar machines from electric motors.

The especial object of this invention is to provide a strong, simple, and efficient construction in which the motor will be supported in a comparatively low and accessible position where its vibrations will not interfere with the work, in which the power of the motor will be transmitted to the machine in a simple and direct manner, and in which the machine may be reversed without reversing the motor.

To this end this invention consists of the driving mechanism and of the combinations of parts therewith, as hereinafter described, and more particularly pointed out in the claims at the end of this specification.

Figure 1:
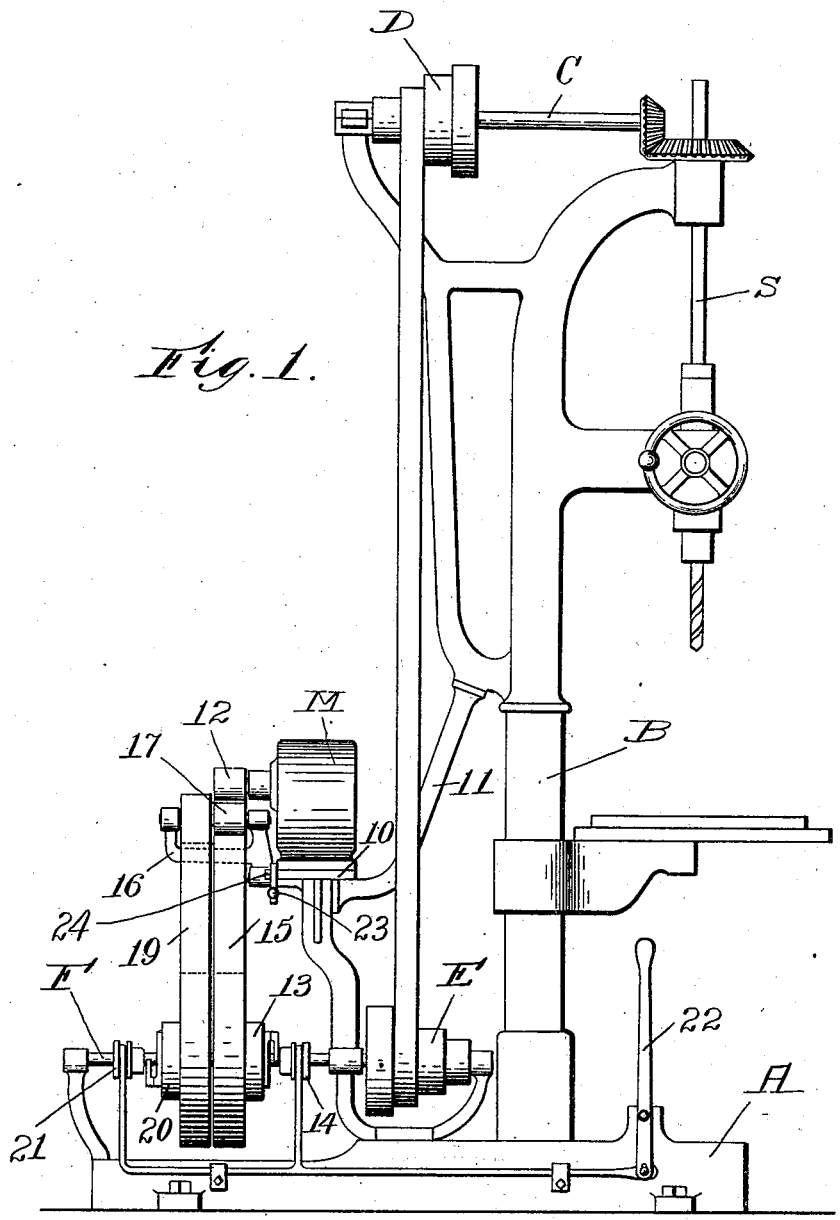
Figure 4:
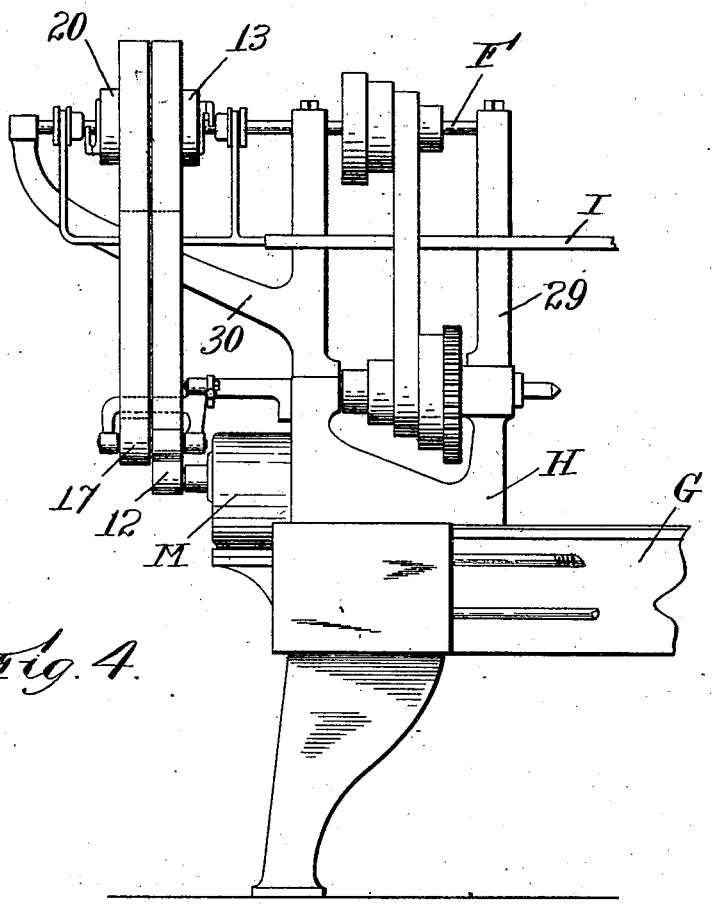
Figure 5:
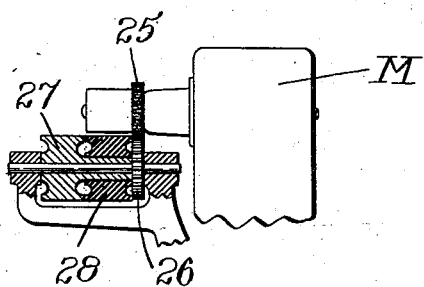

In the accompanying three sheets of drawings, Figure 1 is a side view illustrating the application of my invention to an upright drilling-machine. Fig. 2 is an enlarged view of the parts which comprise my driving mechanism detached from the machine. Fig. 3 is an end view thereof. Fig. 4 is a side view of sufficient parts of an engine-lathe to illustrate the application of my invention thereto; and Fig. 5 is a fragmentary view, partially in section, illustrating a modified form of construction.

In applying electric motors to drive metal-working machinery it has heretofore usually been customary to support the electric motors at the tops of the machine-standards and to connect said motors so that in order to reverse the machines the motors themselves will have to be driven in the opposite direction. In practice I have found that when the electric motors are supported near the tops of the machine-frames the vibrations of the motor are apt to produce bad work, while repeated reversals of an electric motor are injurious to the motor. To avoid these objections, I have provided a driving mechanism in which an electric motor will be supported at a convenient elevation where its vibrations will not affect the work of the machine, and in order to provide for reversals I have utilized a tightening and reversing pulley, which serves the purpose of tensioning the main driving-belt of the electric motor as well as that of turning the driving-shaft in the reverse direction when desired.

Referring to the accompanying drawings for a detail description of the application of my invention, as shown in Fig. 1, A designates the base-plate of an upright drill. Extending up from the base-plate A is a column B. Carried by the column B is a spindle S, which is driven by bevel-gears from a top shaft C. The top shaft C is provided with a cone-pulley D, driven from a cone-pulley E on a driving-shaft F at the base of the machine. These parts may be of substantially the ordinary construction and need not be herein described at length.

In applying an electric motor to drive an upright drilling-machine of this class it has heretofore usually been customary to support the electric motor near the top of the column in such position that its power may be applied directly or nearly directly to the top shaft C.

In practicing my invention I prefer to arrange the motor near the base of the machine or at a convenient elevation therefrom where its vibrations will not affect the work. As herein illustrated, the electric motor M may be fastened on a plate 10, carried by a bracket extending up from the base-plate A.

The motor-support 10 may be stiffened and braced by a bracket 11, connected to the rear arm of the drill-column.

Secured on the shaft of the motor M is a pulley 12, which is connected by a belt 15 to drive a pulley 13, which runs loosely on the driven shaft F. The pulley 13 is provided with the ordinary friction-clutch mechanism, which may be thrown in by the operating-cone 14 in the ordinary manner when it is desired to connect the pulley 13 to the driven shaft F.

To properly tension the main driving-belt 15, as well as to provide a mechanism for reversing the driven shaft F, I employ a tightening and reversing pulley, which not only serves to tension the main driving-belt, but is also turned thereby, so that it may be connected to turn the driven shaft F in the reverse direction.

As herein illustrated, 16 designates an adjustable bracket or sweep having a stud, journaled on which is a tightening and reversing pulley 17. The smaller section of the tightening and reversing pulley 17 runs in contact with the outside surface of the main driving-belt 15, and another section of the tightening and reversing pulley 17, preferably of somewhat larger diameter, has a driving-belt 19 thereon which turns the second pulley 20, loose on the driven shaft F.

The pulley 20 is provided with clutch mechanism which may be operated by a cone 21 when it is desired to connect the pulley 20 to the driven shaft F to reverse the motion thereof.

The cones 14 and 20 may be operated by a sliding connection controlled by a reversing-lever 22. By means of this construction the motor M may be connected to drive the drill-spindle through the main driving-belt 15, the tension of the main driving-belt being regulated by setting the sweep 16 to the desired position by means of a handle 23, as shown in Fig. 3, and holding the same in its adjusted position by a nut 24. The main driving-belt also serves to turn the tensioning and reversing pulley 17, which is connected to drive the drill-spindle in the opposite direction, preferably at a somewhat higher speed.

In some cases instead of relying entirely on friction for the reversal I may provide a construction in which a frictional action of the tightening and reversing pulley will be supplemented by a positive gearing.

As shown in Fig. 5, a rawhide gear 25 may be secured on the shaft of the motor M, which rawhide gear 25 meshes with and drives a metal gear 26. The sections of the tightening and reversing pulley in this construction instead of being rigidly connected are adapted to turn independently of each other, the tightening-section 28 being loosely mounted on the sleeve of the reversing-section 27, the gear 26 being fastened on the end of such sleeve. By means of this construction the reversing-section will be positively driven through the gears 25 and 26, while the friction between the tightening-section 28 and sleeve of the reversing-section 27 will also assist in the reversal.

A driving mechanism constructed according to my invention may be applied to other classes of machinery besides upright drills. For example, in Fig. 4 I have illustrated the application of my invention to an engine-lathe. As shown in this figure, G designates the bed of the ordinary engine-lathe, and H the head-stock thereof. Extending up from the head-stock H are brackets 29 and 30. The motor M is supported on a shelf at the end of the lathe-bed.

The driving connections shown in Fig. 4 comprise a pulley 12 on the motor-shaft, which is connected through a main driving-belt to turn a pulley 13, loose on the driven shaft F, while the main driving-belt also turns a tightening and reversing pulley 17, which is connected to turn the pulley 20, also loose on the driven shaft F. The parts in this reversing mechanism may be substantially the same as in the construction before described, except that the position of said parts are inverted.

Secured on the driven shaft F is a cone-pulley which is connected by a belt to the head-stock cone-pulley of the lathe. Either one of the pulleys 13 and 20 may be connected to turn the driven shaft F by means of clutch connections controlled from the shipper-rod I.

I am aware that changes may be made in practicing my invention by those who are skilled in the art without departing from the scope thereof as expressed in the claims. I do not wish, therefore, to be limited to the constructions I have herein shown and described; but What I do claim, and desire to secure by Letters Patent of the United States, is—

1. In a driving mechanism, the combination of a driven shaft, a motor, a pulley turned by the motor, a main belt for turning the driven shaft in one direction, a belt tightening and reversing pulley for tensioning the driving-belt and connected to turn the driven shaft in the reverse direction and means for coupling the driven shaft to be turned by the main belt or from the belt tightening and reversing pulley.

2. In a driving mechanism, the combination of a driven shaft, a motor-pulley, a main belt for connecting the motor-pulley to turn the driven shaft in one direction, a belt tightening and reversing pulley, one section of which engages the outer surface of the main driving-belt to tension the main driving-belt and be turned thereby, and the other section of which is belted to turn the driven shaft in the reverse direction and means for coupling the driven shaft to be turned by the main belt or from the belt tightening and reversing pulley.

3. In a driving mechanism, the combination of a driven shaft, a motor, a motor-pulley, a main driving-belt connecting the motor-pulley to turn the driven shaft in one direction, a tightening and reversing pulley having two sections of different diameters, the smaller section engaging the outer surface of the main belt to tension the same and be driven thereby, and the larger section being belted to turn the driven shaft in the reverse direction and at a higher speed and means for coupling the driven shaft to be turned by the main belt or from the tightening and reversing pulley.

4. In a driving mechanism, the combination of a driven shaft, a motor, a motor-pulley, a main belt for connecting the motor-pulley to turn the driven shaft in one direction, a tightening and reversing pulley, one section of which engages the outside of the main driving-belt to tension the same and be driven thereby, and the other section of which is belted to turn the driven shaft in the reverse direction, an adjustable support for the tensioning and reversing pulley, means for clamping the adjustable support in different positions to vary the tension of the driving-belt and the power exerted thereby on the tensioning and reversing pulley, and means for coupling the driven shaft to be turned by the main belt or from the tightening and reversing pulley.

5. The combination of a driven shaft, two pulleys loosely mounted thereon, clutch mechanisms for connecting either one of said pulleys to turn the driven shaft, operating connections for the clutch mechanisms, and a driving mechanism comprising an electric motor, a motor-pulley, a main driving-belt connecting the motor-pulley with one of the pulleys on the driven shaft, a belt tightening and reversing pulley, one section of which engages the outer surface of the driving-belt and is driven thereby and the other section of which is belted to turn the other pulley on the driven shaft, and means for adjusting the position of the tightening and reversing pulley to vary the tension of the driving-belt and the power with which the same turns the tensioning and reversing pulley.

In testimony whereof I have hereunto set my hand in the presence of two subscribing witnesses.

F. T. CURRIER.

Witnesses:
 THOMAS H. SULLIVAN,
 PHILIP W. SOUTHGATE.